United States Patent
Barber

(10) Patent No.: US 8,466,577 B2
(45) Date of Patent: Jun. 18, 2013

(54) WIND TURBINE WITH ADJUSTABLE ELECTRICAL GENERATOR

(76) Inventor: Gerald L. Barber, Greenville, SC (US)

( * ) Notice: Subject to any disclaimer, the term of this patent is extended or adjusted under 35 U.S.C. 154(b) by 411 days.

(21) Appl. No.: 12/949,318

(22) Filed: Nov. 18, 2010

(65) Prior Publication Data

US 2011/0068729 A1    Mar. 24, 2011

Related U.S. Application Data

(63) Continuation-in-part of application No. 12/432,837, filed on Apr. 30, 2009, now Pat. No. 7,825,532, and a continuation-in-part of application No. 12/481,817, filed on Jun. 10, 2009, now Pat. No. 8,134,251, and a continuation-in-part of application No. 12/492,187, filed on Jun. 26, 2009, now Pat. No. 8,174,142, and a continuation-in-part of application No. 12/499,206, filed on Jul. 8, 2009, now Pat. No. 8,164,212, and a continuation-in-part of application No. 12/607,440, filed on Oct. 28, 2009, now Pat. No. 8,258,645.

(60) Provisional application No. 61/264,931, filed on Nov. 30, 2009.

(51) Int. Cl.
 *F03D 9/00* (2006.01)
 *H02P 9/04* (2006.01)
 *F03B 13/00* (2006.01)

(52) U.S. Cl.
 USPC ............... 290/55; 290/43; 290/44; 290/54

(58) Field of Classification Search
 USPC .................................. 290/43, 44, 54, 55
 See application file for complete search history.

(56) References Cited

U.S. PATENT DOCUMENTS

| | | | | |
|---|---|---|---|---|
| 4,275,323 A * | 6/1981 | Hatch | ............ | 310/178 |
| 4,330,714 A | 5/1982 | Smith | ............... | 290/55 |
| 6,091,161 A | 7/2000 | Dehlsen | ............ | 290/43 |
| 6,979,171 B2 | 12/2005 | Lauritsen | ........ | 415/4.3 |
| 7,098,552 B2 | 8/2006 | McCoin | ............ | 290/44 |
| 7,218,011 B2 | 5/2007 | Hiel et al. | ........ | 290/43 |
| 7,331,762 B2 | 2/2008 | Fraenkel | ........... | 416/85 |
| 7,417,334 B2 * | 8/2008 | Uchiyama | ......... | 290/55 |
| 7,944,069 B2 * | 5/2011 | Uchiyama | ......... | 290/44 |
| 2004/0151575 A1 | 8/2004 | Pierce et al. | ..... | 415/1 |
| 2007/0040385 A1 * | 2/2007 | Uchiyama | ........ | 290/44 |
| 2007/0154301 A1 | 7/2007 | Hartmann et al. | ... | 415/160 |
| 2009/0091136 A1 | 4/2009 | Viterna | ............. | 290/55 |
| 2009/0096217 A1 | 4/2009 | Watson | ............. | 290/55 |
| 2009/0230692 A1 | 9/2009 | Lopez | ............... | 290/55 |

FOREIGN PATENT DOCUMENTS

| | | |
|---|---|---|
| EP | 0015131 | 9/1980 |
| JP | 2009-030586 | 2/2009 |

OTHER PUBLICATIONS

International Search Report and Written Opinion dated Jan. 27, 2011.

* cited by examiner

*Primary Examiner* — Pedro J Cuevas

(74) *Attorney, Agent, or Firm* — Thomas | Horstemeyer, LLP

(57) ABSTRACT

A wind driven turbine includes a perimeter rim that carries a rotor, and a stator is positioned at the annular path of the rotor with field coils positioned on opposite sides of the rotor that generate electricity in response to the rotation of the rotor. A proximity gauging means selectively maintains the field coils at predetermined distances from the rotor. The wind turbine may be mounted on a floatable support.

12 Claims, 15 Drawing Sheets

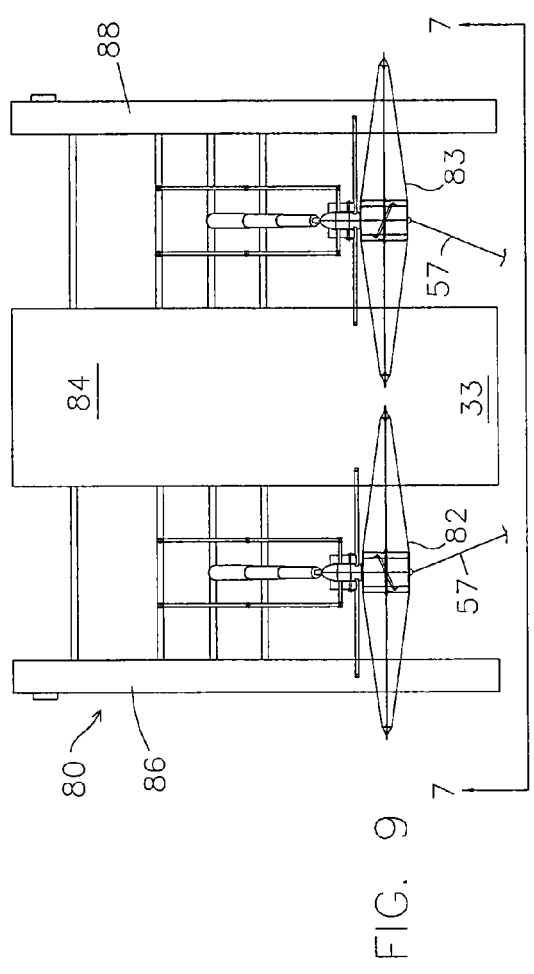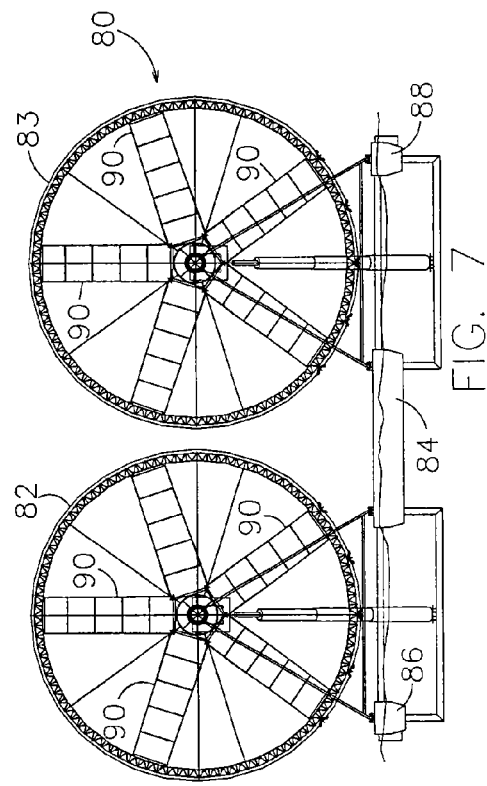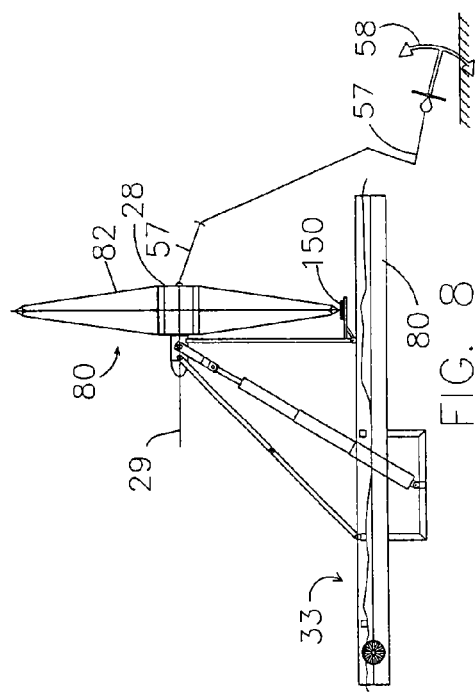

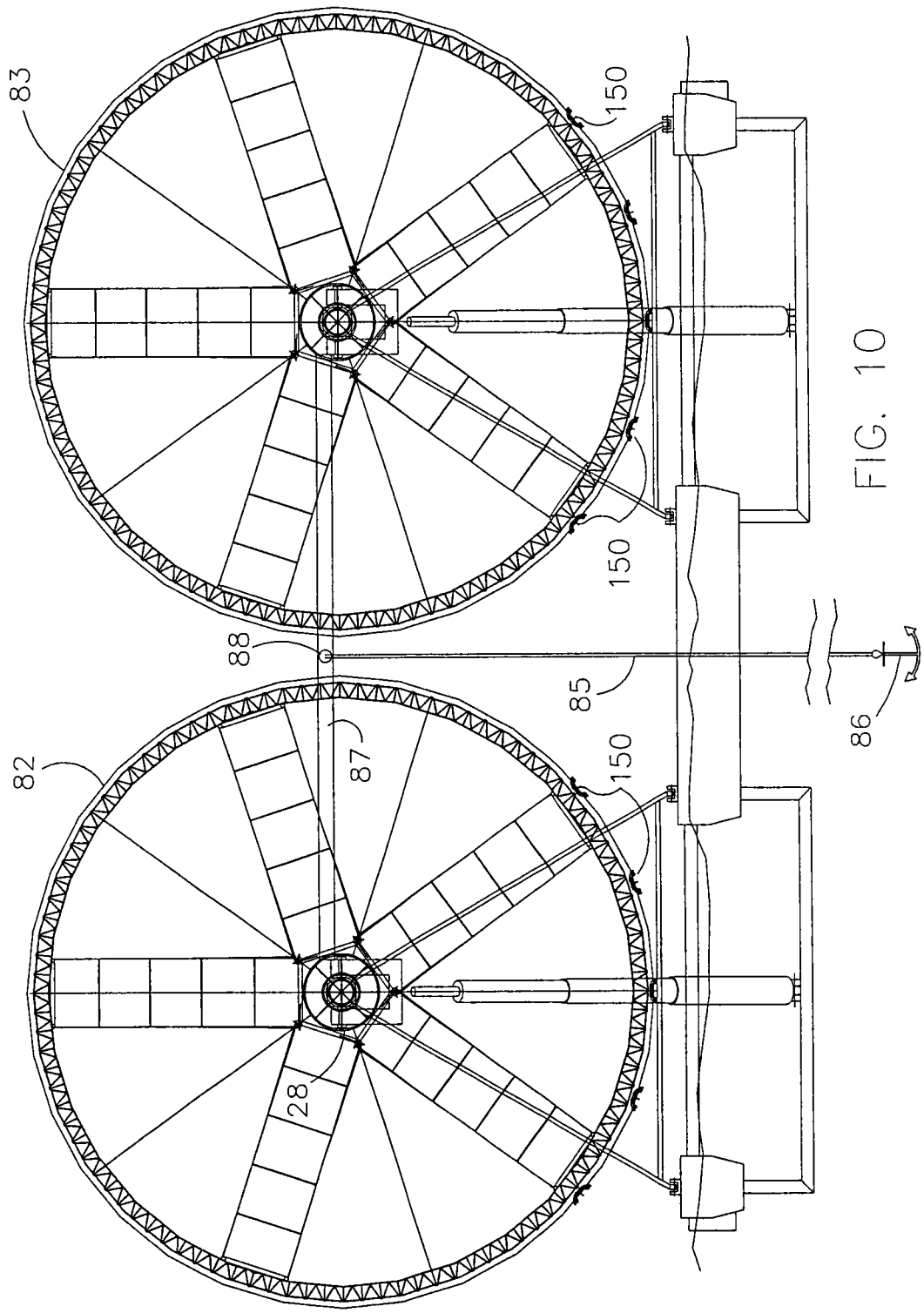

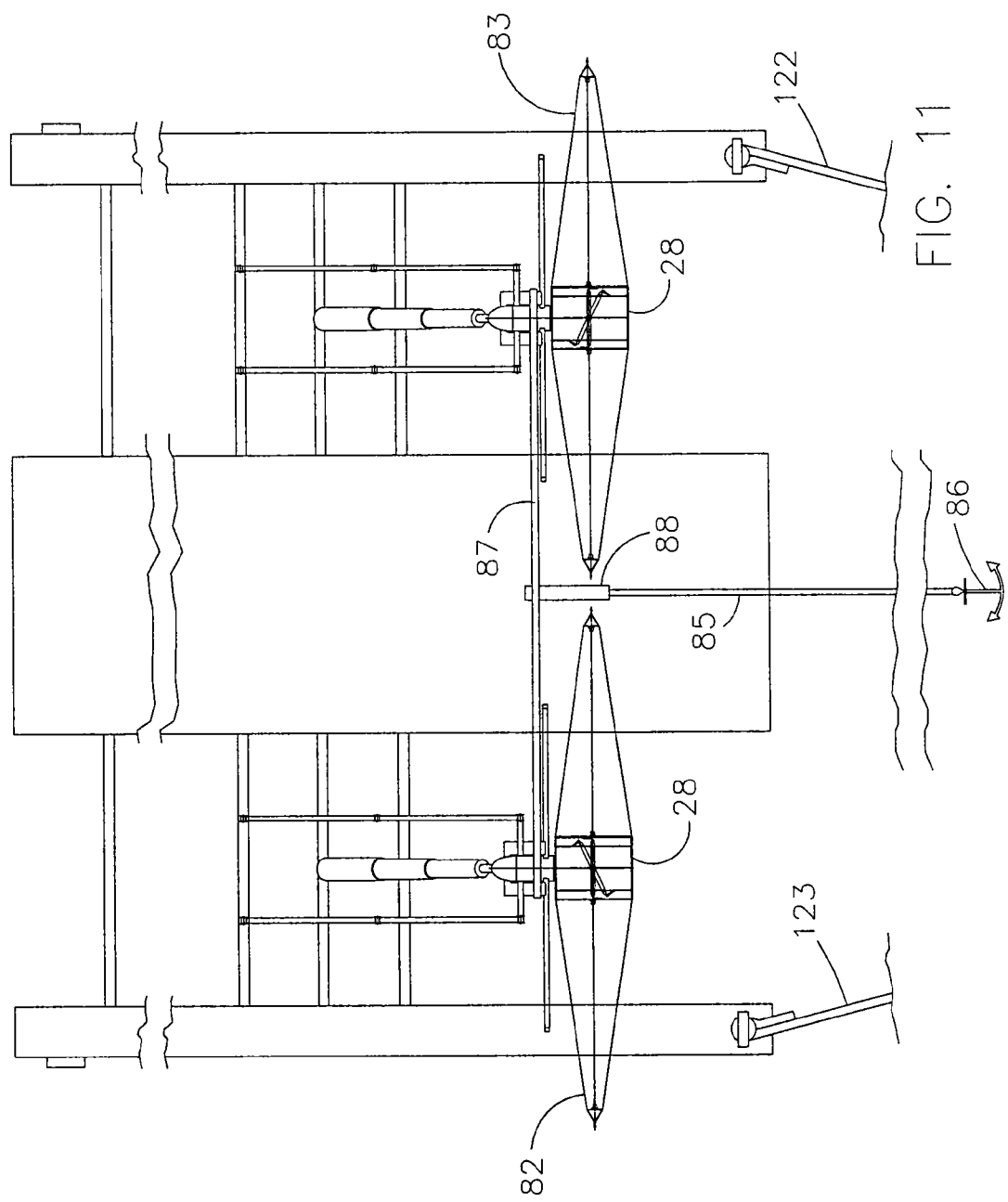

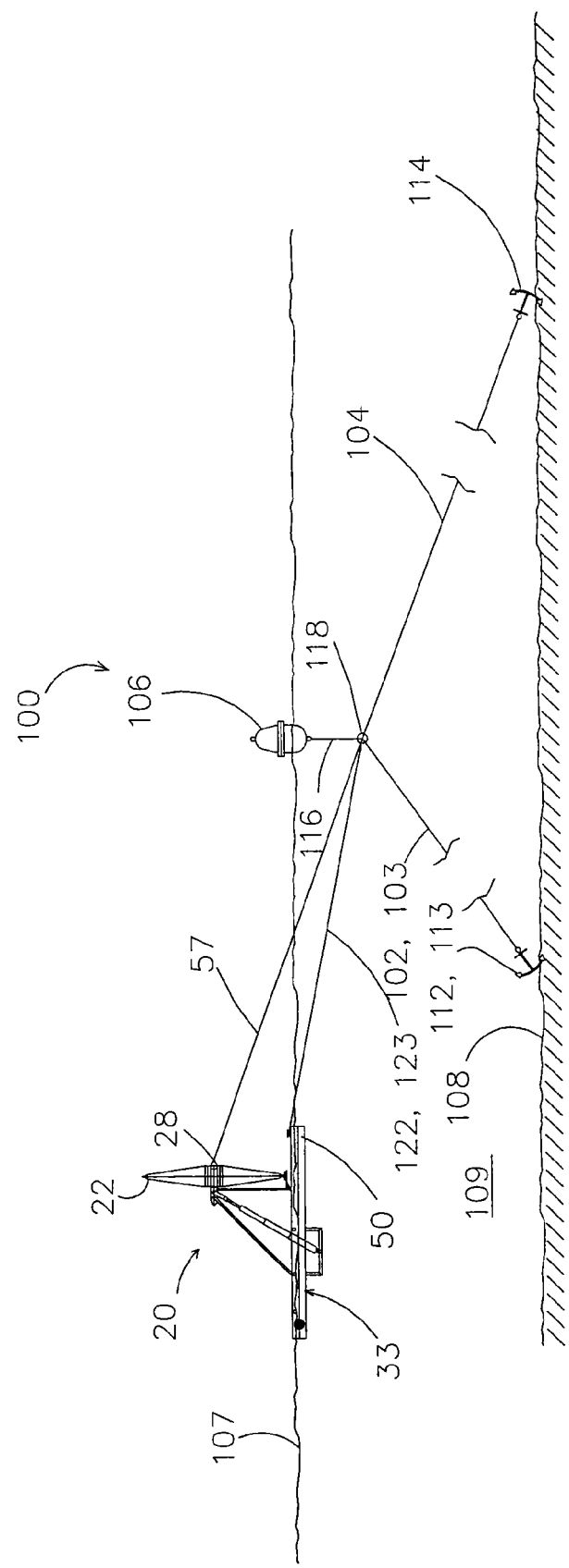

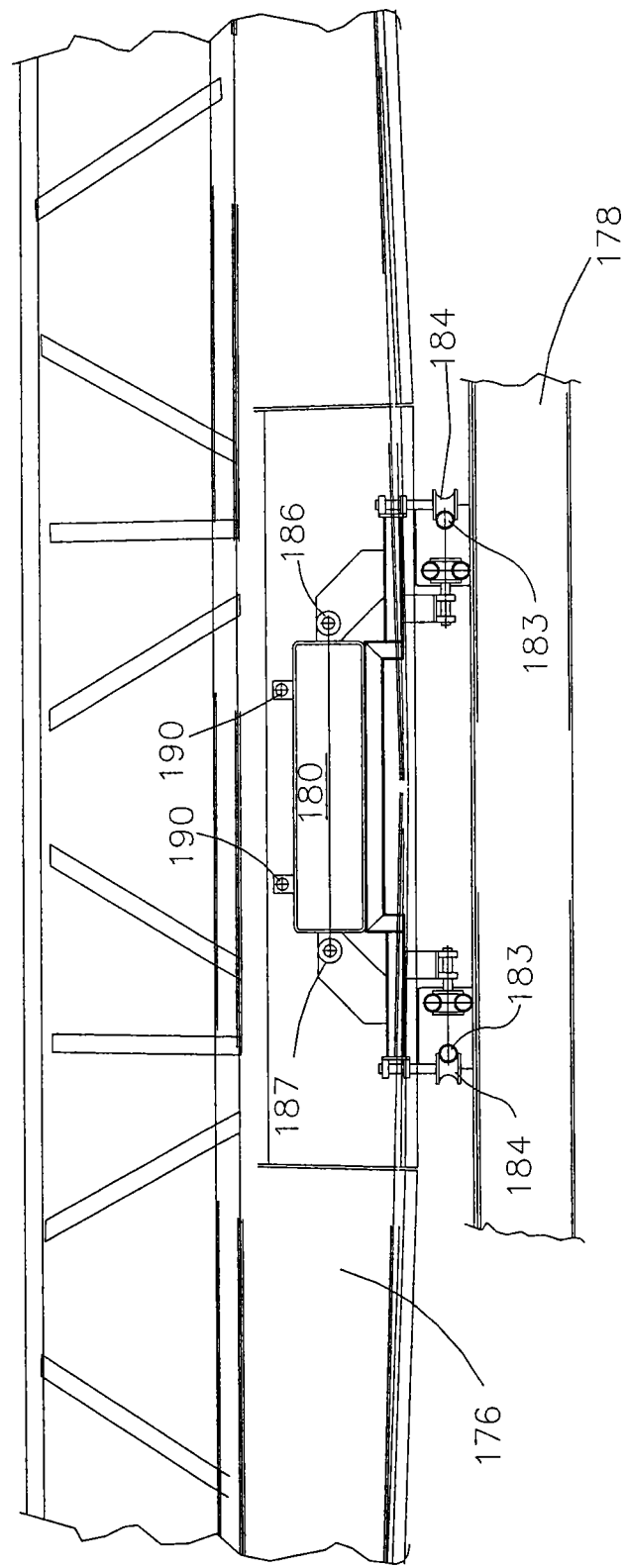

WIND TURBINE WITH ADJUSTABLE ELECTRICAL GENERATOR

CROSS REFERENCE

Applicant claims the benefit of the early filing date of U.S. Provisional Patent Application Ser. No. 61/264,931, filed Nov. 30, 2009, in the U.S. Patent and Trademark Office. This application is a continuation-in-part of U.S. patent application Ser. No. 12/432,837, filed Apr. 30, 2009; a continuation-in-part of U.S. application Ser. No. 12/481,817, filed Jun. 10, 2009; a continuation-in-part of U.S. application Ser. No. 12/492,187, filed Jun. 26, 2009; a continuation-in-part of U.S. application Ser. No. 12/499,206, filed Jul. 8, 2009; and a continuation-in-part of U.S. application Ser. No. 12/607,440, filed Oct. 28, 2009.

FIELD OF THE INVENTION

This invention concerns a wind turbine assembly for generating electricity in response to the movement of atmospheric wind. The electrical generator is made up of a perimeter rim of the wind turbine functioning as a rotor of the electrical generator and a stationery stator assembly straddling the rotor rim. The wind turbine may be mounted on a floatable support.

BACKGROUND OF THE INVENTION

Windmills have been used for many generations for the purpose of pumping water from the ground and for generating electricity. A basic advantage of the windmill is that it uses the power of atmospheric wind to rotate a wheel having radially extending blades. This rotary movement may be converted into various useful purposes. For example, wind turbines in the form of propellers mounted on towers have been placed in areas where steady winds are prevalent and the wind turbines are used to generate electricity.

The blades of the conventional wind turbines are very large and made of expensive rigid material and are constructed to have the blades extend radially from a central hub, with no extra support at the outer tips of the blades. The conventional wind turbine blades rotate at a high rate of revolution and must withstand the centrifugal forces generated by the fast revolution of the blades, the cantilever bending forces applied to the blades by the wind, and the twisting forces applied to the pitched surfaces of the blades. Since the outer portions of the blades move at a very high velocity and are engaged by strong winds, the larger blades require the blades to be strong, and the stronger they are the more expensive they become. Thus, there is a practical limit as to the length and width of the blades.

Some of the prior art wind turbines are constructed with an outer rim that extends circumferentially about the turbine wheel and the blades are supported at their outer ends by the circumferential rim. Rubber tires are placed in positions to engage the outer rim so as to rotate the rubber tires, with the driven rubber tires rotating the rotors of generators. Thus, the rotation of the wind turbine is used to generate electricity.

Prior art wind turbines are mounted on upright towers and the towers are supported at their bases by mounting the towers in the earth or on some other stable platform. When the wind turbine is in operation with an oncoming brisk wind engaging the angled blades of the turbine wheel, a significant longitudinal force is transmitted from the blades of the turbine wheel to the upper portion of the tower, tending to tip the tower. This horizontal tipping force usually is significantly greater than the circumferential wind force engaging the angled surfaces of the blades of the turbine wheel and causing the rotation of the turbine wheel. This longitudinal force requires the tower for a wind turbine to be very strong to avoid tipping over.

While wind turbines have found use in open land areas where steady winds are prevalent, the land areas most suitable for catching the wind on wind turbine propeller blades usually are remote from the areas of greatest need of electrical power. Therefore, there is a requirement that electrical power be transmitted through conductive cables for long distances to the areas of need.

Winds generated over large bodies of water, particularly over an ocean, are not confronted with mountains, buildings, and the vegetation of the land masses that tend to slow the velocity of winds. The turbulence of wind usually is less over water than over land. This may be because there is a greater temperature variance between different altitudes over land than over a body of water, apparently because sunlight is absorbed further into water than into land, and for comparable conditions, the surfaces of land become warmer and radiate more heat than the surfaces of water.

Also, some of the largest cities of the world are positioned adjacent large bodies of water such as adjacent oceans and seas where wind velocities are not slowed and are less turbulent near the water surface and are more predictable.

Another advantage of wind turbines placed on bodies of water is that the less turbulent winds at the surface of the water allow the turbine wheel to be supported lower, closer to the surface of the water. This tends to reduce the expense of having a tall tower as usually required for land mounted wind turbines.

Accordingly, it would be desirable to locate wind turbines on bodies of water spaced relatively close to a land mass where there is a need for electricity. Also, it would be desirable to produce wind turbines with a means for reducing the longitudinal force applied by the turbine wheel to the tower or other vertical support of the wind turbine. Also, it would be desirable that a wind turbine supported on a body of water be able to turn into the oncoming wind when the wind changes directions, and that the perimeter of the turbine wheel be used to generate electricity.

Also, it would be desirable to produce and use a wind turbine or other rotary device that operates an electrical generator with a reduction in the drag and friction in the course of producing electricity, and to permit a wider range of rates of rotation of the turbine wheel while producing electricity. The wind turbine may include an outer perimeter rim that may be used for both stabilizing and supporting the sail wings or propellers of the wind turbine wheel and for forming a rotor for a stator that, together, function as an electrical generator.

SUMMARY OF THE DISCLOSURE

Briefly described, this disclosure concerns a wind turbine assembly for generating electricity that may include a floatable support, a single turbine wheel or a pair of turbine wheels rotatably mounted on the floatable support about a longitudinally extending central axis, the turbine wheels including a circular rim concentric with and rotatable about their respective central axes, and an electrical generator in operable relationship with respect to each of the turbine wheels.

In one embodiment, a wind driven turbine wheel may be mounted on a floatable support that is located on the surface of a large body of water, with an anchor system that ties one or several of the wind turbine assemblies to a location where they each may move in a circular arc so as to turn into the wind in response to the wind force, without the turbine wheels clashing with one another.

Another feature of this disclosure is the electrical generator that registers with the perimeter rim of the turbine wheel, with the rim including the rotor of the generator. The stator assembly is constructed so as to move laterally as may be necessary so as to accommodate for the lateral movements of the rotor while continuing to generate electricity in response to the movement of the rotor.

Other objects, features and advantages of the present disclosure will become apparent upon reading the following specification, when taken in conjunction with the accompanying drawings.

BRIEF DESCRIPTION OF THE DRAWINGS

FIG. 7 is a front elevational view of a double wind turbine assembly, including a pair of wind turbine wheels mounted on a common floatable support.

FIG. 8 is a side elevational view of the double wind turbine of FIG. 6.

FIG. 9 is a plan view of the double wind turbine of FIG. 6.

FIG. 10 is a front elevational view of a double wind turbine similar to FIG. 7, but including a modified anchoring structure.

FIG. 11 is a plan view of the wind turbine of FIG. 10.

FIG. 12 is a side view of one of the floatable wind turbines tied to and rotatable about a stabilized anchor system.

FIG. 20 is a side view of the stator of FIGS. 18 and 19.

DETAILED DESCRIPTION

Figure 1:
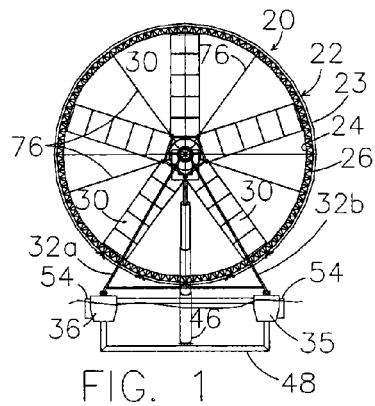
FIG. 1 is a front elevational view of a floating wind turbine, showing the turbine wheel in its upright position.

Referring now in more detail to the drawings in which like numerals indicate like parts throughout the several views, FIG. 1 shows a wind turbine 20 that is designed for catching the wind and rotating for the purpose of generating electricity. The wind turbine includes a turbine wheel 22 having an outer perimeter 23 formed by a series of angle braces 24 and an outer perimeter circular rim 26 that extends continuously about the turbine wheel. The outer perimeter circular rim may be formed of arcuate segments and, as explained in more detail hereinafter, the perimeter rim may function as the rotor of an electrical generator or may function to drive a rotor of an electrical generator.

An axle structure 28 is at the center of the turbine wheel 22 and a plurality of sail wing assemblies 30 are mounted to the axle structure 28 and extend radially toward the angle braces 24 that form the perimeter of the turbine wheel. The turbine wheel rotates about the central axis 29.

Figure 5:
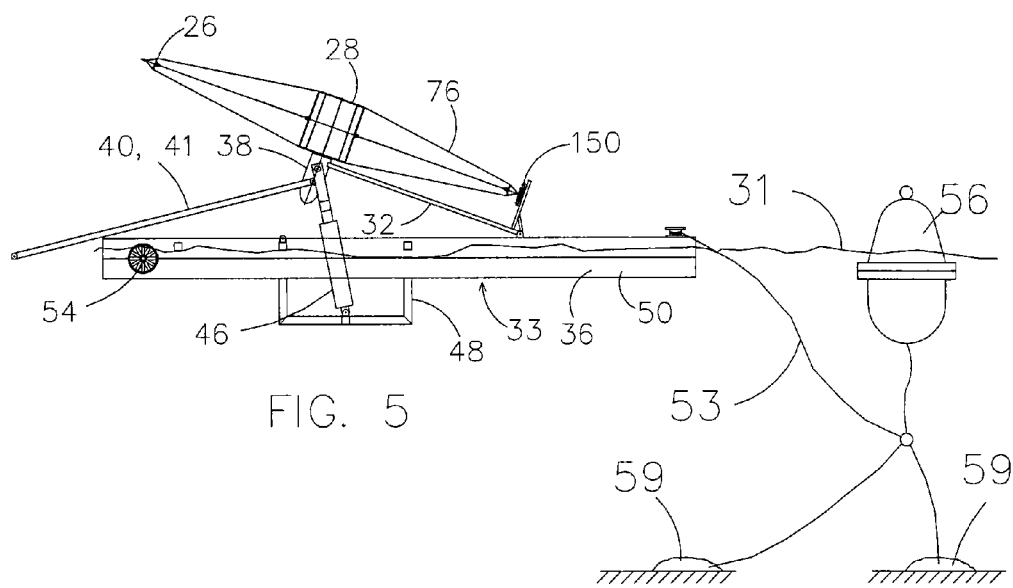
FIG. 5 is a side view of the wind turbine of FIG. 4, showing the turbine wheel tilted in its inoperative position.

The wind turbine assembly may be used on a body of water such as an ocean or lake 31 where the atmospheric wind 37 usually is of higher velocity, less turbulent and more predictable than the atmospheric wind over a land mass. When used on water, the turbine assembly may include a floatable support 33, such as a pontoon boat, barge or other suitable floatable support. The floatable support of FIGS. 1-5 is a pontoon boat having parallel pontoons 35 and 36. The wind turbine assemblies of FIGS. 1-5 include a foldable tower assembly 32 that includes a pair of tower arms 32A and 32B that are connected at their lower end portions to pontoons 36 and 35, respectively, and converging upwardly toward one another in a vertical plane to an upward apex that is in support of the bearing housing 38 at the axial structure 28 of the turbine wheel 22. The tower arms 32A and 32B are foldable about their lower ends to an attitude more horizontal, as shown in FIG. 5, so that the turbine wheel 22 moves more toward a supine position over the pontoons 35 and 36.

Stabilizing arms 40 and 41 are parallel to one another and sloped upwardly from the pontoon boat and may be pivotally mounted to the bearing housing 38. The lower ends of the stabilizing arms 40 and 41 may releaseably connect to the cross frames of the pontoon boat, such as cross frame 44. When the turbine wheel 22 is to be tilted toward its supine position, the lower ends of the stabilizing arms 40 and 41 are detached from the cross frame member 44, allowing the turbine wheel 22 to tilt toward its supine position.

Hydraulic cylinder 46 is mounted at its lower end to depending framework 48 and at its upper end to the bearing housing 38. When the hydraulic cylinder 46 is distended, it holds the foldable tower assembly 32 in its upright attitude, allowing the stabilizing arms 40 and 41 to be connected at their lower ends to the cross frame member 44, thereby holding the turbine wheel 22 in its upright position. However, when the stabilizing arms 40 and 41 are disconnected at their lower ends from the cross frame member 44, the hydraulic cylinder 46 may be retracted, causing the turbine wheel 22 to tilt toward its supine position as shown in FIG. 5.

The foldable tower assembly 32 may be collapsed and used when transporting the wind turbine assembly to and from its site of operation, and for maintenance or repair. The wind turbine also may be supported on a non-foldable, more permanent upright tower carried by the floatable support, if desired.

The floatable support 33 of the wind turbine assembly 20 is considered to have a bow at 50 and a stern at 52. The turbine wheel 22 faces the bow 50. Lateral thrusters 54 may be mounted to the pontoons 35 and 36, typically at the stern 52 of the pontoons. The bow 50 may be connected by a first anchor line 53 or other appropriate means to an anchor such as to an anchored buoy 56 that functions as an anchor. The anchored buoy 56 may comprise a pier, anchor, dock, or other means that generally is not removable from a designated position in or adjacent a body of water. The anchor line 53 may be a chain, cable, twisted hemp rope or other conventional means or combination of these and other connectors for connecting the floatable support to an anchor. The buoy 56 may be anchored to the bottom of the body of water by anchor 59

When the atmospheric wind 37 moves against the wind turbine assembly 20, the anchor 56 (buoy, pier, etc.) to which the wind turbine assembly is tied stabilizes the bow 50 of the floatable support, usually causing the wind turbine assembly to move downwind of its anchor. In order to assure that the turbine wheel 22 faces the oncoming atmospheric wind, the lateral thrusters 54 shown in FIGS. 1-5 and 11 may be actuated in response to a wind direction finder (not shown), tending to turn the floatable support and, therefore, the turbine wheel more directly into the atmospheric wind.

The lateral thrusters 54 of FIGS. 1-5 typically are mounted to the stern 52 of the floatable support 33 so that the anchor 56, 59 stabilizes the bow of the floatable support while the lateral thrusters tend to swing the stern in alignment with the bow and atmospheric wind. This assures that the turbine wheel 22 more directly faces the oncoming atmospheric wind, taking advantage of the wind movement through the sail wing assemblies 30, causing efficient rotation of the turbine wheel 22. Lateral thrusters, sometimes known as "bow thrusters" are conventional in the art and may be found at Mabru Thrusters, Miami, Fla. 33142.

Figure 2:
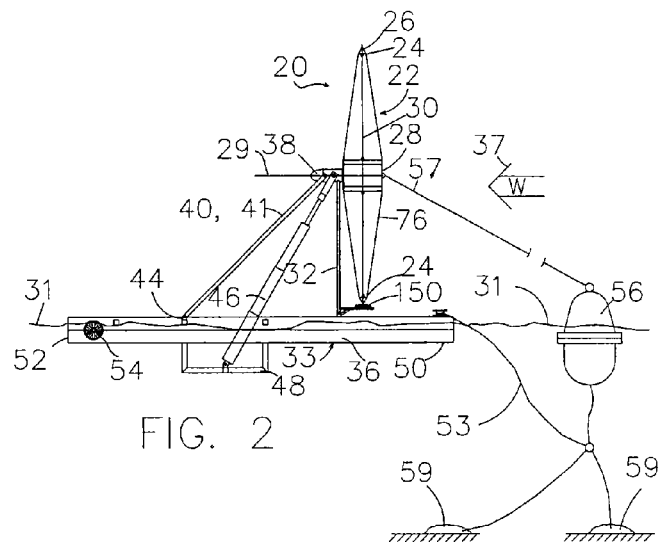
FIG. 2 is a side elevational view of the wind turbine of FIG. 1.

As shown in FIGS. 2 and 5, the anchor, such as a buoy 56, pier or other stationary docking point for the wind turbine assembly includes an electrical connection (not shown) to the electrical generator 150 of the wind turbine assembly 20 and an electrical conductor 62 to a receiver that may be on an adjacent land mass for transmitting the electrical power generated by the wind turbine assembly.

The turbine wheel and its floatable support may be very large in length, width and height. Because of the uncontrolled velocity of the atmospheric wind and because of the large height and other large size dimensions of the wind turbine assembly, it is desirable to construct the wind turbine assembly so that it resists capsizing or tilting or other deviation from facing the atmospheric wind and it is desirable to minimize the application of longitudinal and other horizontal forces to the tower 32 and its stabilizing arms 40, 41. As shown in FIG. 2, in addition or alternatively, a second anchor line 57 may be connected at one of its ends to the axle structure 28 of the turbine wheel 22 and connected at its other end to an anchor 59. The second anchor line 57 may be made of materials the same as or similar to those described above for the first anchor line. The second anchor 59 may be any device that resists movement, including stationary structures such as piers, buoys, conventional anchors and other devices suitable for holding the wind turbine assembly in its predetermined position, including but not limited to those described above for the first anchor. Typically, if the anchor line is to be connected to a submerged anchor, the anchor line may be long enough to have a length to height ratio of at least about seven to one.

The connection of the second anchor line 57 to the axle structure 28 of the turbine wheel 22 is at the center of the wind forces applied to the turbine wheel. The centered connection of the anchor line to the turbine wheel provides a balanced longitudinal support for the wind turbine, directly opposite to the direction of the on-coming wind 37, and relieves force otherwise applied by the turbine wheel to the tower structure that extends from the turbine wheel to the floatable support. Since the turbine wheel usually is centered over an intermediate portion of the floatable support, the restraining forces applied by the anchor line to down-wind movement of the wind turbine assembly tend to maintain the wind turbine assembly in its upright attitude and facing the oncoming atmospheric wind. The connection of the anchor line 57 to the axle structure at the upper end portion of the tower assembly 32 opposes and resists the longitudinal forces applied by the oncoming wind forces that are being applied to the wind turbine wheel 22. Thus, the force applied by the anchor line resists the tipping of the tower 32 and allows the tower structure to be less strong, less expensive and lighter than would be required without the anchor 59 and anchor line 57.

Figure 6:
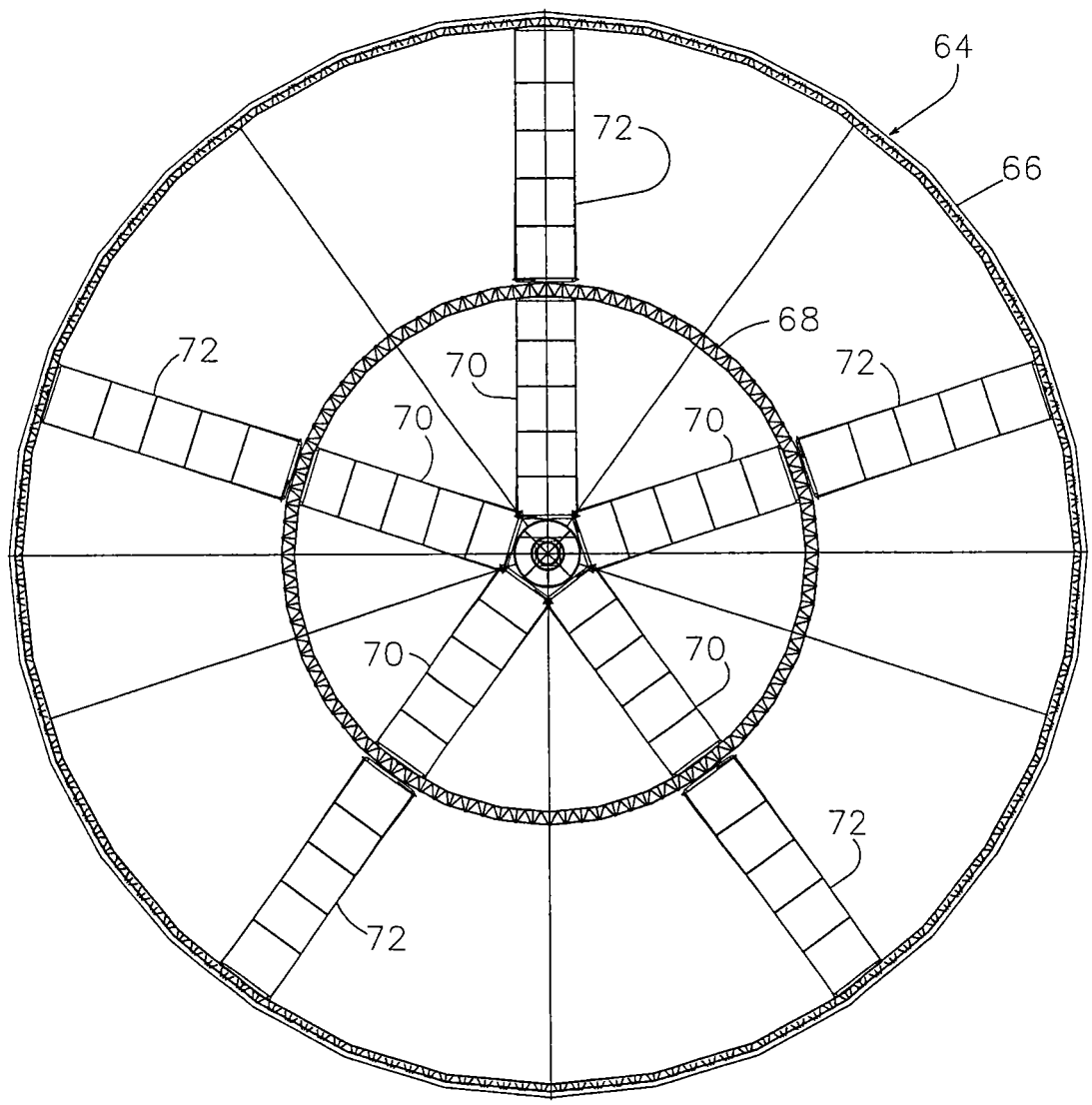
FIG. 6 is a front elevational view of a modified wind turbine wheel, similar to the turbine wheels of FIGS. 1-5, but including an intermediate circular rim that is concentric with the outer circular perimeter rim, with inner sail wings supported between the axle structure and the intermediate support rim and outer sail wings supported between the intermediate support rim and the outer circular perimeter rim.

FIG. 6 shows a modified form of the turbine wheel. Turbine wheel 64 includes an outer rim 66 and a smaller intermediate rim 68, both rims being circular and concentric with the axis of rotation of the turbine wheel. A plurality of inner sail wings 70 extend between the axle structure and the intermediate rim 68, and a plurality of outer sail wings 72 extend between the intermediate circular rim 68 and the outer circular rim 66. The pitch of the outer sail wings 72 typically will be different from the pitch of the inner sail wings 70 since the circular velocity of the outer sail wings is greater than the circular velocity of the inner sail wings. Also, the use of the intermediate circular rim 68 stabilizes the inner and outer sail wings so that the total length of the inner and outer sail wings 70 and 72 may be greater than the length available on a single set of sail wings.

Figure 3:
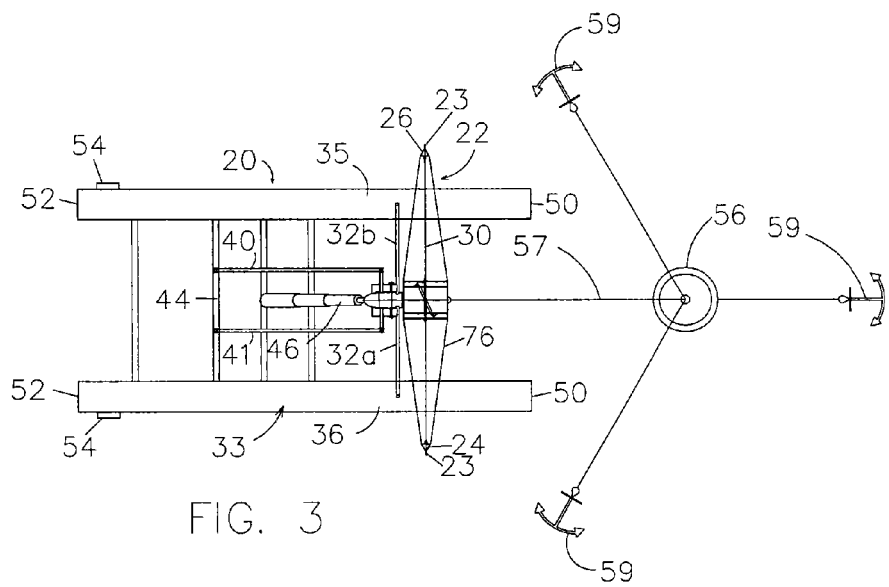
FIG. 3 is a plan view of the wind turbine of FIGS. 1 and 2.
Figure 4:
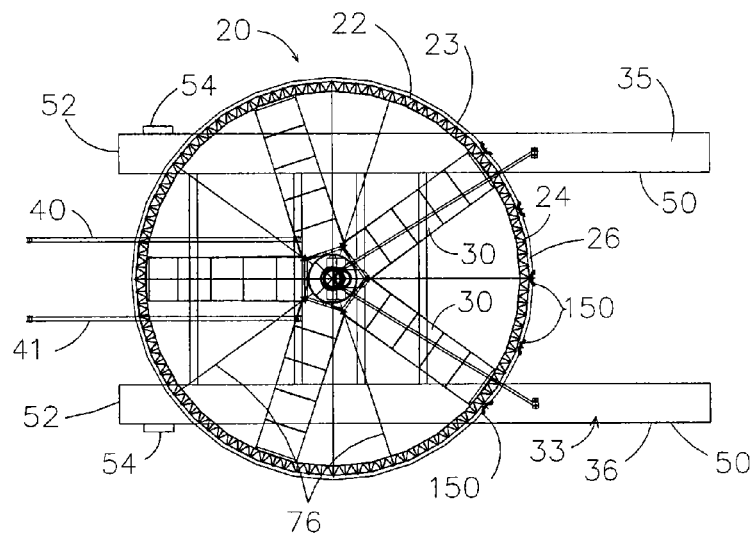
FIG. 4 is a plan view of the wind turbine of FIG. 1, but showing the turbine wheel tilted in its inoperative position.

As shown in FIGS. 2, 3 and 5, the axle structure 28 of the turbine wheel is of greater thickness than the circular perimeter rim 26. A plurality of spokes 76 extend from the ends of the axle structure 28 outwardly and converge into supporting relationship with respect to the circular perimeter rim 26. This provides lateral and radial stability to the circular perimeter rim 26.

FIGS. 7-9 show a wind turbine assembly 80 that is a "twin" assembly of the wind turbine assembly of FIGS. 1-5, that includes turbine wheels 82 and 83 that are substantially identical to the turbine wheel 22 of FIGS. 1-5. The floatable support 33 is modified so as to provide a central pontoon 84, with parallel outer pontoons 86 and 88, all pontoons supporting the turbine wheels as described in connection with FIGS. 1-5.

The sail wings 90 of one turbine wheel 82 may be oriented with a pitch so that the atmospheric wind will rotate the turbine wheel in a clockwise direction, whereas the sail wings 90 of the other turbine wheel 83 are oriented at a reverse pitch from that of the turbine wheel 82. This causes the turbine wheels to rotate in opposite directions when facing the oncoming atmospheric wind. This tends to neutralize the gyroscopic effect of the rotation of the turbine wheels of the twin wind turbine assembly 80.

FIGS. 10 and 11 show a twin wind turbine assembly, similar to FIGS. 7-9, but having a cross brace 87 rigidly connected at its ends to the central axle structure of each turbine and which functions as a horizontal tower. Anchor line 85 is connected at its distal end to the anchor 86 and connected at its proximal end to the horizontal cross brace 87 at a position between the turbine wheels. The cross brace 87 includes a rigid connector 88 connected to and extending forwardly between the wind turbine wheels 82, 83 and connects to the more flexible anchor line 85. This avoids contact between the more flexible anchor line 85 and the turbine wheels 82, 83. Also, this places the longitudinal support applied by the anchor 86 and anchor line 85 at the axial center of the turbine wheels, at the desired mid-height of the turbine wheels, above the base of the tower and extended out in front of the turbine wheels, where the force applied by the anchor is centered at the height of axle structures of the turbine wheels.

FIG. 12 is a side view of a wind turbine, such as wind turbine 20 of FIGS. 1-4, and shows the stabilized anchor system 100 connected to the wind turbine. The wind turbine 20 includes its anchor line 57 connected to the axle structure 28 of the turbine wheel 22. The anchor line 57 extends into the water and is connected to the stabilized anchor system 100.

Figure 13:
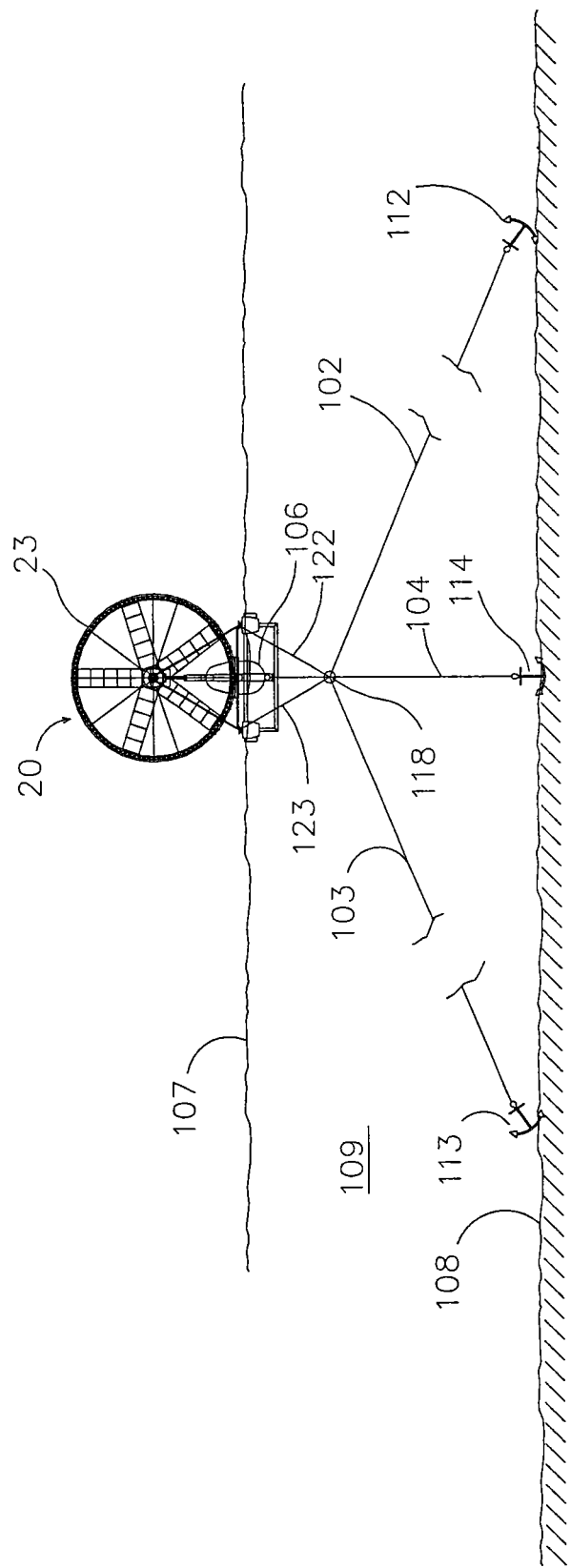
FIG. 13 is a front view of a floatable wind turbine, showing the stabilized anchor system of FIG. 12.
Figure 14:
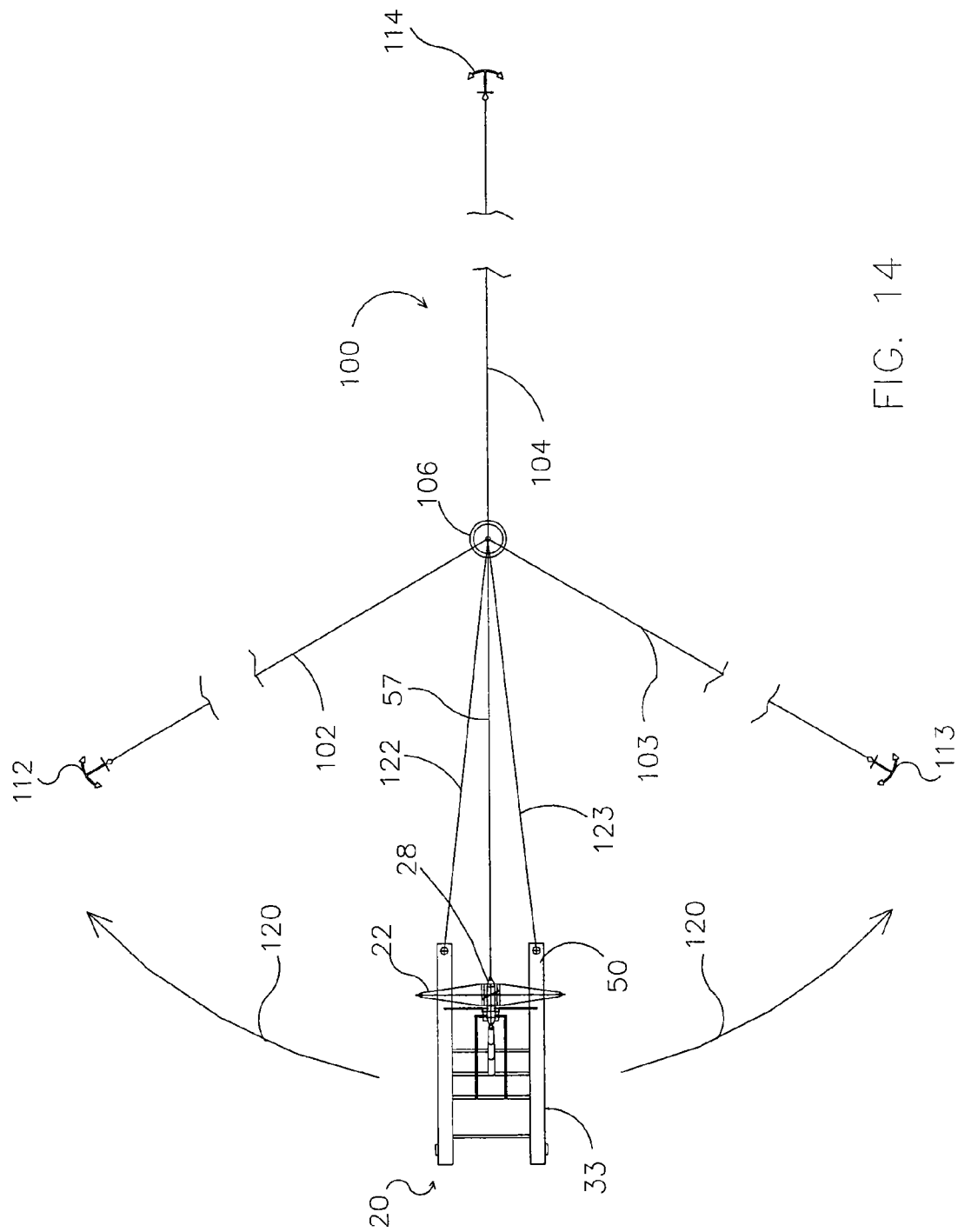
FIG. 14 is a plan view of the wind turbine and the anchor system of FIGS. 12 and 13.

As shown in FIGS. 12-14, the stabilized anchor system 100 includes three submerged anchor lines 102, 103, and 104 that are connected at their upper ends to the central connector 118. Central connector 118 is suspended in the water 109 by a connector line 116 that is tied at its lower end to the central connector and at its upper end to buoy 106 that floats on the surface 107 of the water. The submerged anchor lines 102, 103 and 104 all extend downwardly from the central connector and each are connected at their lower ends to an anchor 112, 113 and 114, respectively. The anchors hold the stabilized anchor system in a fixed position on the bottom 108 of the body of water 109.

FIG. 14 shows that the anchors 112, 113 and 114 are spaced from each other at approximately 120° so that the submerged anchor lines 102, 103 and 104 tend to form a "tripod" that engages the bottom 108 of the body of water 109. The anchor line 57 leads from central connector 118 to the wind turbine 20.

The submerged anchor lines 102, 103 and 104 maintain central connector 118 in a substantially fixed position beneath the surface 107 of the body of water 109. Buoy 106 and its connector line 116 maintain the central connector 118 at a predetermined distance below the surface 107 of the body of water 109. This tends to avoid having anchor line 57 and the submerged anchor lines 102, 103 and 104 interfere with naval traffic at the surface 107 of the body of water 109. Also, the anchor line 57 of the wind turbine 20 may be disconnected from either of its ends, from the central connector 118 or from the wind turbine 20, and the central connector 118 will remain substantially fixed in its original position, with the buoy 106 maintaining the central connector at the predetermined depth below the surface 107 of the body of water 109.

Also, the stabilized anchor system 100 allows the wind turbine 20 to be moved in a circular path about the buoy 106 and the central connector 118, as indicated by the arrows 120 of FIG. 14. The wind turbine may move a full 360° circle about the buoy 106 and the central connector 118.

As shown in FIGS. 12-14, the stabilized anchor system 100 also may include stabilizing cables 122 and 123. Each stabilizing cable 122 and 123 may be connected at its proximal end to central connector 118 and at its distal end to the floatable support 33 at the bow 50. As shown in FIG. 14, the floatable support 33 may be a catamaran having two parallel floats with one turbine wheel 22, or may be a floatable support with two or more wind turbines or 82, 83 mounted thereon as shown in FIG. 11, or the floatable support may be other floatable structures, such as a barge or a ship. The stabilizing cables 122 and 123 are connected at their distal ends to the bow of the floatable support, with the cables connected at opposite sides of the centerline of the floatable support. The spread apart connections of the cables to opposite sides of the bow 50 of the floatable support 33 causes the floatable support to face the buoy 106, and the prevailing winds typically will move the wind turbine assembly 20 downwind of the buoy 106 with the wind turbine facing the buoy. The stabilizing cables 122 and 123 assure that the wind turbine assembly 20 will not turn away from facing relationship with respect to the oncoming wind in response to wind turbulence, tides, wave action, or, in the case of a pair of turbine wheels mounted on the floatable support, in response to higher wind velocities on one turbine wheel than on the other or other atmospheric conditions.

While the drawings show the stabilizing cables 122 and 123 connected to a wind turbine assembly having a single turbine wheel, the stabilizing cables may also be connected to a wind turbine assembly having more than one turbine wheel, as shown in FIG. 11. If one turbine happens to get more wind than the other turbine and if there is a tendency of the floatable support to turn away from facing the buoy 106, the stabilizing cables 122 and 123 will resist the tendency of the wind turbine assembly to turn away from the oncoming wind.

In the event that the wind turbine must be disconnected from the stabilized anchor system 100 for repair or because of severe weather conditions, the anchor line 57 and the stabilizing cables 122 and 123 may be disconnected at either of their ends, either from the wind turbine 20 or from the central connector 118, and the wind turbine towed to another location such as a maintenance and repair location. The buoy 106 remains at the site of the stabilized anchor system 100 so that it is available for reconnection of the same wind turbine 20 or a substitute wind turbine, etc.

Also, electrical conductor cables (not shown) may be mounted to the buoy 106 or to the central connector 118, with the electrical conductor cables extending from another location to the buoy/central connector, and a second electrical conductor cable (not shown) may be extended from the wind turbine 20 so as to connect with the first cable. Thus, the buoy 106 and central connector 118 provide a connector point for the electrical conductor leading from the wind turbine 20, allowing the electricity generated by the wind turbine to be transmitted to a delivery point.

Figure 15:
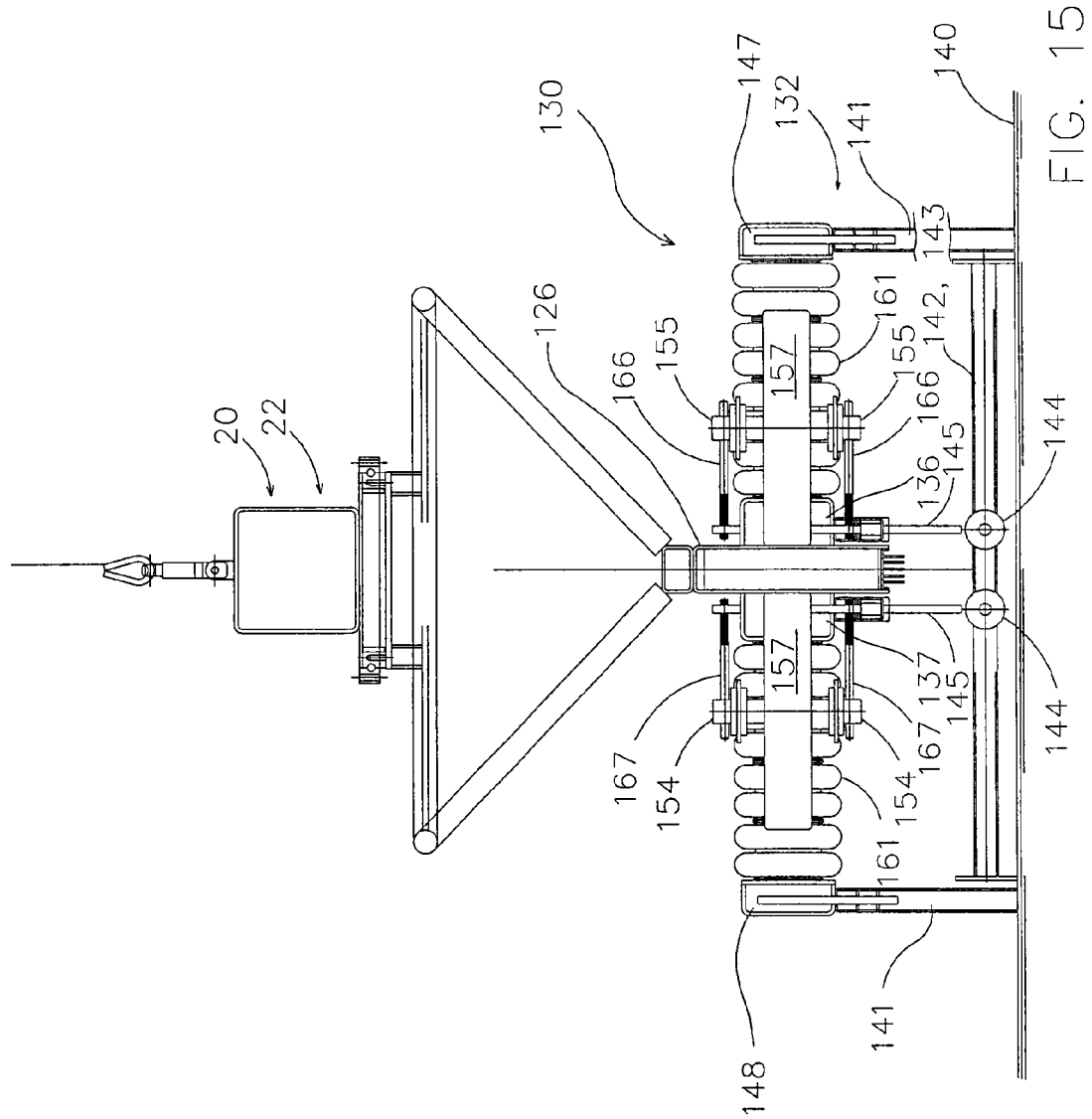
FIG. 15 is an end view of the lower portion of the wind turbine, showing the perimeter rim of the turbine wheel passing through the stator.
Figure 16:
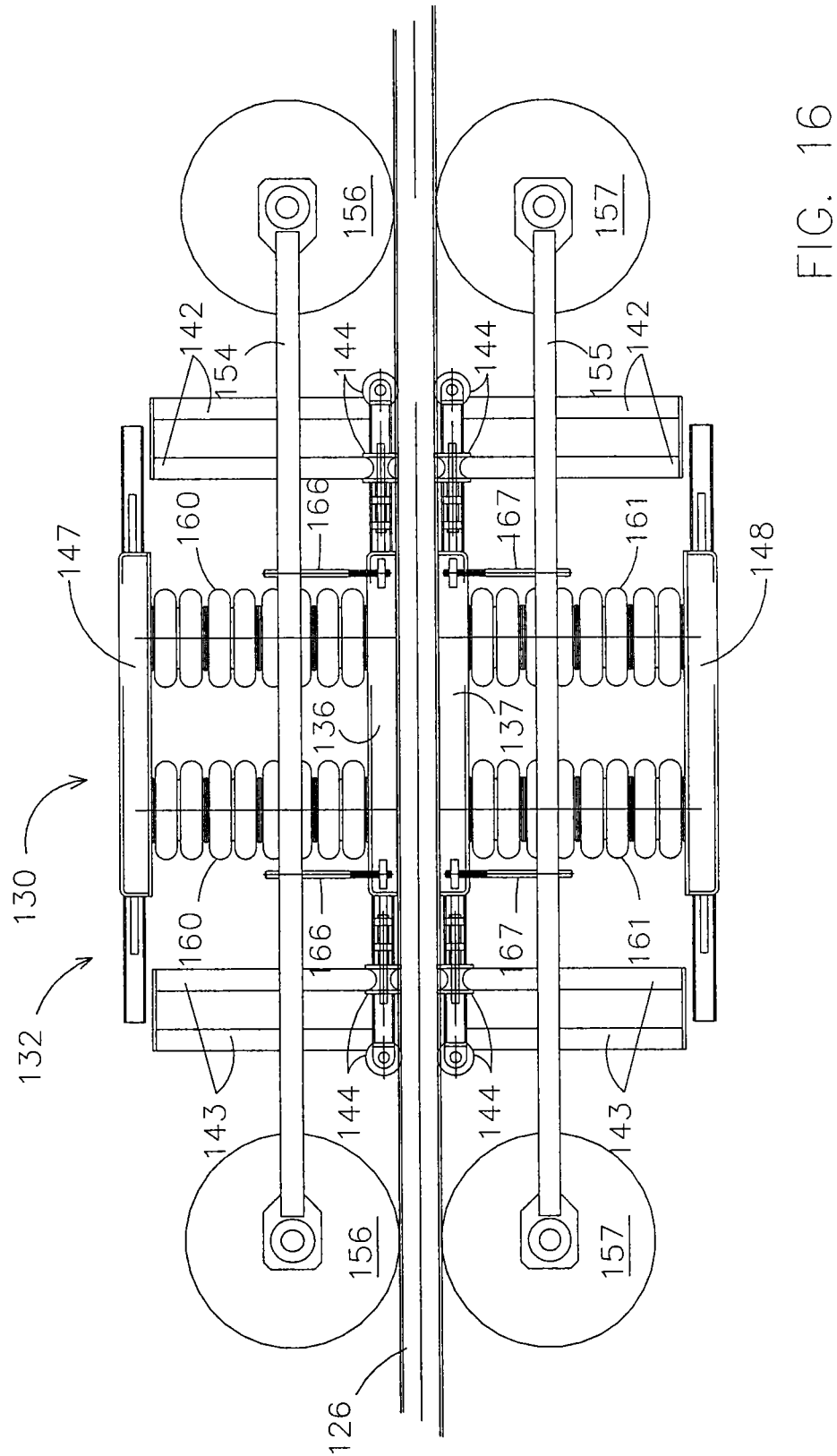
FIG. 16 is a top view of the stator, showing how the perimeter rim moves between the pairs of wheels of the stator.
Figure 17:
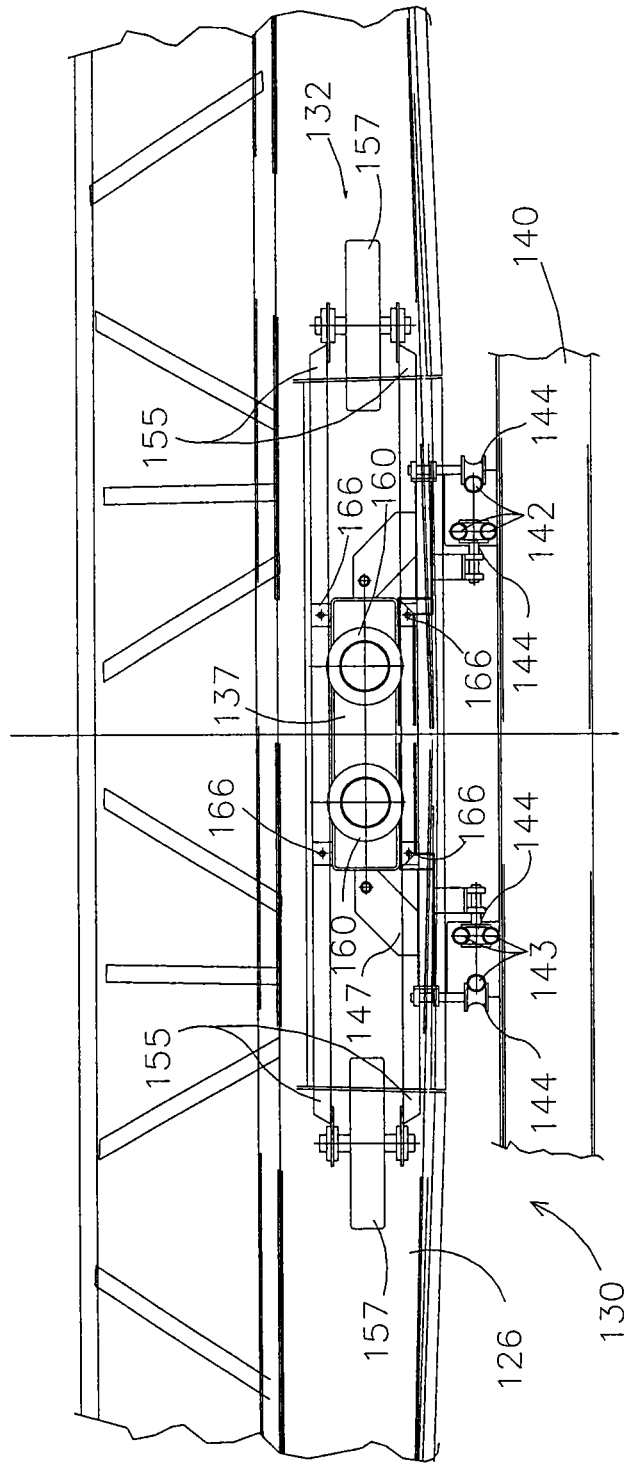
FIG. 17 is a side view of the stator, showing the wheels of the stator in engagement with the perimeter rim.

As shown in FIGS. 2, 5, and 10, electrical generators 150 may be positioned at the lower portion of the perimeter of the turbine wheel 22 of the wind turbine assembly 20. One type of electrical generator is known as a bellows actuated perimeter generator 130 that is illustrated in FIGS. 15-17. The outer perimeter circular rim 126 of the turbine wheel 22 functions as a rotor of the generator. Electrical coils and magnets (not shown) are positioned in the hollow portion of the outer perimeter circular rim 126 so when the turbine wheel 22 is rotated, the rim 126 functions as the rotor of the generator.

As shown in FIGS. 15-17, the stator assembly 132 is mounted at the perimeter of the turbine wheel and is positioned to straddle and receive the outer perimeter circular rim 126 that functions as the rotor of the generator. The rotor 126 is formed in arcuate segments about the perimeter of the turbine wheel, and each arcuate segment of the rotor includes its own magnets and coils.

The stator assembly 132 includes a pair of substantially identical cup-shaped stator housings 136 and 137 having open ends that face the adjacent surfaces of the outer perimeter circular rim 126 of the turbine wheel 22. Electrical coils (not shown) are contained within the cup-shaped stator housings 136 and 137 so that the movement of the outer perimeter circular rim between the cup-shaped stator housings induces electrical current.

Spacer wheels 156 and 157 may be made of soft material that will engage the outer perimeter circular rim 126 without substantial wear to the rim. Such suitable materials would be a soft plastic or a rubber tire of the type used on current automobiles or trailers. In addition, the wheels riding on the rim could be replaced by other linear type bearings, including sliding surfaces or air bearings.

The stator assembly is supported on a platform 140 by a framework 141, and guide rails 142 extend below the cup-shaped stator housings 136, with the guide rails extending normal to the direction of movement of the outer perimeter circular rim 126 of the turbine wheel 22. Support wheels 144 engage the guide rails 142, and the support members 145 are mounted on the support wheels 144 and extend upwardly to support the cup-shaped stator housings 136 and 137. As the cup-shaped stator housings move laterally, the support wheels rotate along the guide rails 142 to continuously support the cup-shaped stator housings.

Framework 141 includes end supports 147 and 148, and pairs of air actuated bellows 161 and 162 are supported at their outer ends on the end supports and extend inwardly into engagement with the cup-shaped stator housings 136 and 137. Air under pressure is applied to the bellows 161, 162 to urge the cup-shaped stator housings 136, 137 inwardly toward the outer perimeter circular rim 126 of the turbine wheel 22. When the air pressure is relieved, the bellows 161, 162 retract to withdraw the cup-shaped stator housings 136, 137 from the outer perimeter rim.

Spacer wheel support frames 154 and 155 are mounted to the cup-shaped stator housings and support the spacer wheels 156 and 157 on opposite sides of and adjacent the outer perimeter circular rim 126. The pairs of spacer wheels 156 and 157 engage opposite surfaces of the outer perimeter circular rim 126 of the turbine wheel 22. Adjustment screws 166 and 167 connect the cup-shaped stator housings to the spacer wheels support frames. There are four adjustment screws, one at each corner of the cup-shaped stator housing, that function to position the rims of the cup-shaped stator housings in close juxtaposition with the facing surfaces of the outer perimeter circular rim. The spacer wheels rotate and move laterally in response to the movements of the outer perimeter circular rim 126. The lateral movements of the outer perimeter circular rim 126 moves the cup shaped stator housings 136 and 137 a corresponding lateral distance so that the cup-shaped stator housings move laterally in unison with the lateral movements of the outer perimeter circular rim, and maintain their close juxtaposition with respect to the outer perimeter circular rim.

If one or both of the cup shaped stator housings 136 and 137 are not disposed properly adjacent the outer perimeter circular rim 126, adjustment can be made through the rotation of the adjustment screws 166, 167. Typically, there will be four adjustment screws, one at each corner of each cup-shaped stator housing 136 and 137, so as to tilt the cup-shaped stator housings into proper attitude.

The pairs of spacer wheels 156 and 157 assure that the cup-shaped stator housings 136 and 137 are maintained at the proper spacing adjacent and facing outer perimeter circular rim 126, and the spacer wheels 156 and 157 also assure that if the outer perimeter circular rim 126 tends to move laterally at the position of the bellows actuated perimeter generator 130, the pairs of spacer wheels 156 and 157 move the cup-shaped stator housings 136 and 137 in the same direction, thereby maintaining the close juxtaposition of the cup-shaped stator housings 136 and 137 with respect to the outer perimeter circular rim 126.

Figure 18:
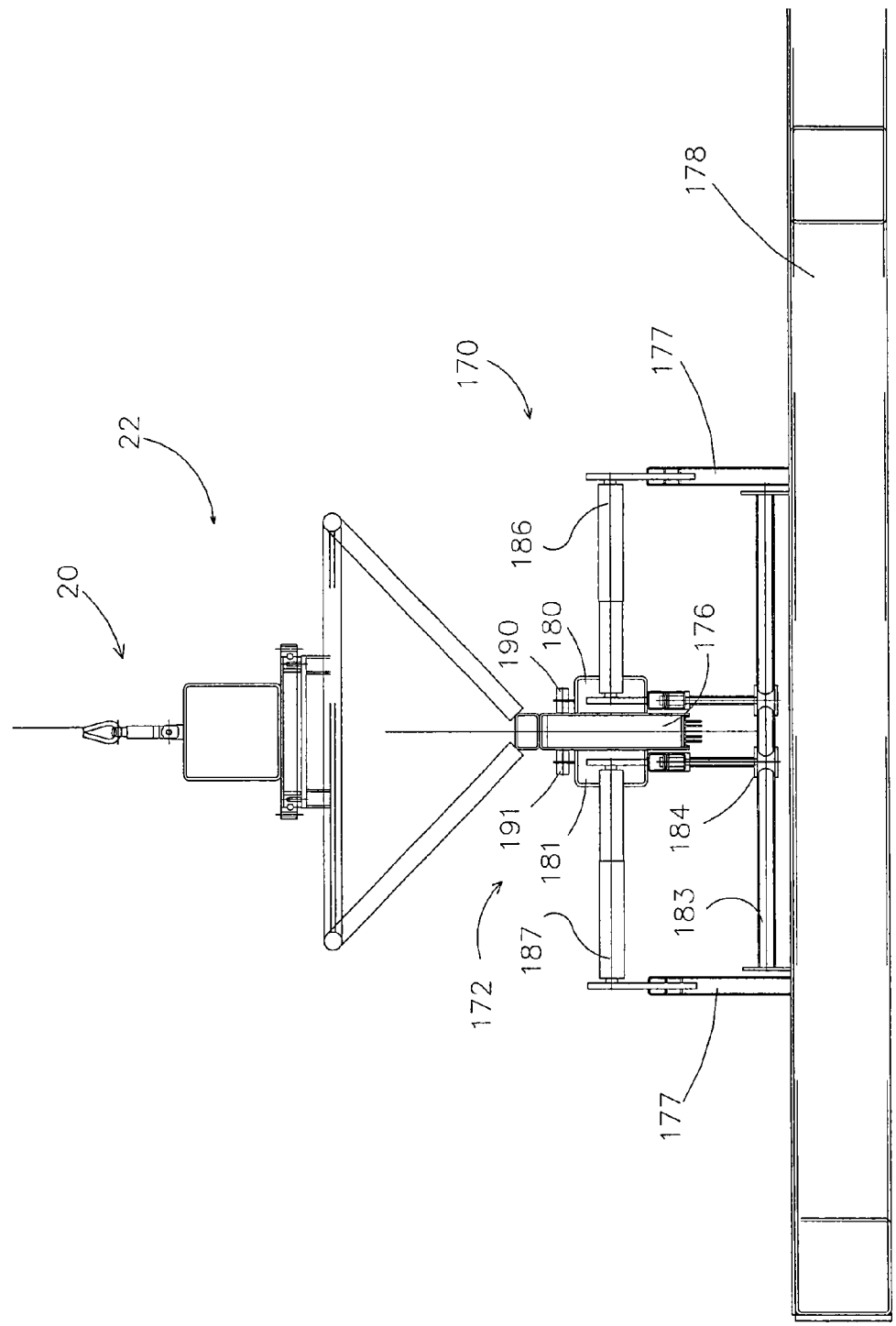
FIG. 18 is an end view of the modified form of the stator, showing how the stator is applied to the perimeter rim of the rotor.
Figure 19:
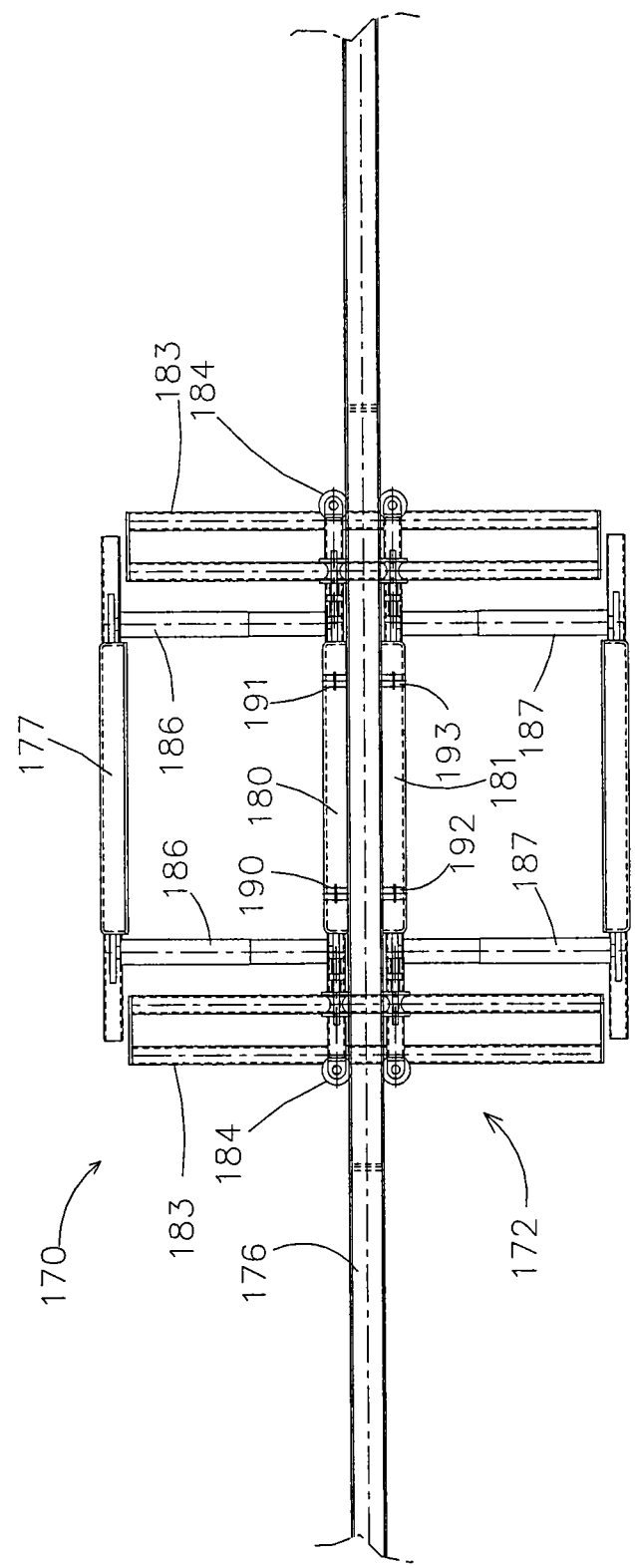
FIG. 19 is a top view of the stator of FIG. 18, showing how the perimeter rim is engaged by the stator.

FIGS. 18-20 illustrate the linear actuated perimeter generator 170 that includes a stator assembly 172 mounted about the outer perimeter circular rim 176 of a turbine wheel 22 of the wind turbine assembly 20. A framework 177 is mounted on a platform 178, and cup-shaped stator housings 180 and 181 are mounted on the framework in opposite facing directions and facing toward the surfaces of the outer perimeter circular rim 176 of the turbine wheel 22. The cup-shaped stator housings 180 and 181 are supported on guide rails 183 by support wheels 184, as previously described.

Linear actuators 186 and 187 extend between the framework 177 and the cup-shaped stator housings 180 and 181, with a pair of linear actuators 186 positioned at opposite ends of the cup-shaped stator housings 180 and a pair of linear actuators 187 engaging the opposite ends of the cup-shaped stator housing 181.

Proximity sensors 190, 191, 192 and 193 are supported by the cup-shaped stator housings 180 and 181 at positions adjacent the linear actuators 186 and 187. The proximity sensors 190-193 function to control the movements imparted to the cup-shaped stator housings 180 and 181 so that when the outer perimeter circular rim 176 moves laterally toward or away from the cup-shaped stator housings 180 or 181, the proximity sensors 190-193 detect the movement and control the linear actuators 186 and 187 so as to move the cup-shaped stator housings in the same direction. This arrangement maintains the cup-shaped stator housings 180 and 181 in the optimum close juxtaposed relationship with respect to the facing surfaces of the outer perimeter circular rim 176 of the turbine wheel 22.

It is anticipated that the diameter of the turbine wheel is very large, in some instances by more than 100 feet in diameter. Because of the great size of the turbine wheel and because of slight lateral movement of the turbine wheel induced by intensity and direction of the atmospheric winds, and by other imperfect surfaces and movements of surfaces, the perimeter rim is likely to move laterally as it moves through its circular path. The structures that are described herein compensate for the lateral movement. For example, if the perimeter rim at its lower arc moves laterally as well as longitudinally, the stator moves latterly in unison with the movement of the lower arc of the perimeter rim.

While the stator structures described herein are designed for engagement with a turbine wheel, multiple ones of the stator structures may be applied to a single turbine wheel, and multiple turbine wheels may be used on a single floatable support as described earlier herein.

Also, while the stator structures disclosed herein are described in connection with floatable supports, it should be apparent that the same or similar stator structures may be used in connection with land mounted wind turbine assemblies.

While the expression "electrical generator" has been used herein, it should be understood that this term may identify other rotary devices that may be driven by the wind turbines disclosed herein, such as alternators, pumps, etc.

It will be understood by those skilled in the art that while the foregoing description sets forth preferred embodiments in substantial detail, modifications, additions, and changes might be made thereto without departing from the spirit and scope of the structures set forth herein.

The invention claimed is:

1. An electrical generator comprising a turbine wheel mounted for rotation on a horizontal axis, said electrical generator comprising:
   a circular rotor mounted on said turbine wheel and extending concentrically about the horizontal axis for rotation with said turbine wheel in a perimeter path about the horizontal axis, said circular rotor including radially extending opposed sides,
   a stator positioned at the perimeter path of said circular rotor, said stator including field coils positioned on said opposed sides of said circular rotor and facing said opposed sides of said circular rotor as said circular rotor rotates about the horizontal axis for generating electricity in response to the rotation of said rotor,
   a linear actuator coupled to each said field coil for moving said field coils toward or away from said rotor, and
   a proximity sensor movable with said stator field coils at said opposed sides of said rotor for determining the position of said stator field coils with respect to said opposed sides of said rotor such that in response to a change in proximity of said circular rotor with respect to said field coils the proximity censor activates said linear actuator to move said field coils closer to or further away from said opposed sides of said rotor.

2. The electrical generator of claim 1 and wherein said linear actuators each comprise a fluid operated piston.

3. The electrical generator of claim 2, wherein said fluid operated pistons comprise double acting fluid operated pistons.

4. The electrical generator of claim 1, and wherein said stator comprises a pair of opposed stator housings positioned on opposite sides of said rotor with said field coils positioned in said stator housings, said stator housings each including a field coil opening facing opposed sides of said rotor.

5. The electrical generator of claim 1, and wherein said rotor is formed in series of arcuate segments.

6. The electrical generator of claim 1, and wherein said electrical generator is mounted on a floatable support, and an anchor line is attached to said turbine wheel at the level of said horizontal axis.

7. The electrical generator of claim 1, wherein said proximity sensors detect the proximity of said opposed surfaces of said rotor independently of each other to activate said linear actuators independently of each other.

8. An electrical generator for generating electricity comprising a turbine wheel mounted for rotation on a horizontal axis,
   a circular rotor mounted on said turbine wheel and extending concentrically about the horizontal axis for rotation with said turbine wheel in a perimeter path about the horizontal axis, said circular rotor including radially extending opposed sides,
   a stator positioned at the perimeter path of said circular rotor, said stator including a pair of stator housings positioned at said opposed sides of said rotor, said stator housings each including a field coil opening facing said opposed sides of said rotor, and field coils positioned in each of said stator housings and facing said rotor through said field coil openings for generating electricity in response to the rotation of said rotor,
   a pair of guide rollers mounted to each said stator housing and bearing against said radially extending opposed sides of said circular rotor at positions adjacent said stator housings,
   adjustment screws extending between said pairs of guide rollers and said opposed stator housings for adjusting the positions of said stator housings with respect to said radially extending opposed sides of said circular rotor.

9. The electrical generator of claim 7 wherein said guide rollers straddle said stator housings for bearing against said radially extending opposed sides of said circular rotor as said rotor moves toward and away from said stator housings.

10. An electrical generator for a wheel mounted for rotation on a horizontal axis, said electrical generator comprising:
   a circular rotor mounted on said wheel and extending concentrically about the horizontal axis for rotation with the wheel in an annular path about the horizontal axis, said circular rotor including radially extending opposed sides,
   a stator positioned at the annular path of said rotor, said stator shaped for receiving said rotor and including a pair of field coils positioned on said opposed sides of said rotor and generating electricity in response to the rotation of said rotor, and
   proximity gauging means for selectively maintaining said stators at a predetermined distance from said radially extending opposed sides of said rotor.

11. The electrical generator of claim 10, wherein said proximity gauging means comprises a pair of guide rollers mounted to each said stator housing and bearing against said radially extending opposed sides of said circular rotor at positions adjacent said stator housings,
   adjustment screws extending between said pairs of guide rollers and said opposed stator housings for adjusting the positions of said stator housings with respect to said radially extending opposed sides of said circular rotor.

12. The electrical generator of claim 10, wherein said proximity gauging means comprises a linear actuator coupled to each said field coil for moving said field coils toward or away from said rotor, and
   a proximity sensor movable with said stator field coils at said opposed sides of said rotor for determining the position of said stator field coils with respect to said opposed sides of said rotor such that in response to a change in proximity of said circular rotor with respect to said field coils the proximity censor activates said linear actuator to move said field coils closer to or further away from said opposed sides of said rotor.

* * * * *